(12) United States Patent
Haber

(10) Patent No.: US 7,510,147 B2
(45) Date of Patent: Mar. 31, 2009

(54) VIBRATION DAMPING PYLON

(75) Inventor: Ofer Haber, Haifa (IL)

(73) Assignee: Rafael Advanced Defense Systems Ltd., Haifa (IL)

(*) Notice: Subject to any disclaimer, the term of this patent is extended or adjusted under 35 U.S.C. 154(b) by 0 days.

(21) Appl. No.: 11/221,946

(22) Filed: Sep. 9, 2005

(65) Prior Publication Data

US 2006/0060713 A1    Mar. 23, 2006

(30) Foreign Application Priority Data

Sep. 22, 2004    (IL) ........................... 164229

(51) Int. Cl.
*B64D 1/12*    (2006.01)
*F41F 5/00*    (2006.01)
(52) U.S. Cl. ............... 244/137.4; 89/1.51; 244/137.1; 244/54
(58) Field of Classification Search ............ 244/1 R, 244/137.1, 54, 53 R, 55, 137.4; 188/380; 396/7, 12, 13; 89/1.51
See application file for complete search history.

(56) References Cited

U.S. PATENT DOCUMENTS

| | | | | |
|---|---|---|---|---|
| 2,506,095 A * | 5/1950 | Mantz | ........................ | 396/12 |
| 2,829,561 A * | 4/1958 | Granfelt | ..................... | 89/1.51 |
| 3,039,725 A * | 6/1962 | Kerley, Jr. | .................... | 248/570 |
| 3,204,911 A * | 9/1965 | Lawrence et al. | ........... | 248/611 |
| 3,204,913 A * | 9/1965 | Lawrence et al. | ........... | 248/570 |
| 3,327,965 A * | 6/1967 | Bockrath | ..................... | 244/54 |
| 3,351,307 A * | 11/1967 | Michel et al. | ............... | 248/636 |
| 3,596,865 A * | 8/1971 | Camossi | ..................... | 248/318 |
| 3,946,976 A * | 3/1976 | Radford | ..................... | 248/580 |
| 4,135,688 A | 1/1979 | England | | |
| 4,502,652 A * | 3/1985 | Breitbach | ................ | 244/99.13 |
| 5,169,110 A * | 12/1992 | Snaith et al. | ................ | 248/570 |
| 5,370,349 A * | 12/1994 | Bousquet et al. | ............ | 248/332 |
| 5,374,012 A * | 12/1994 | Marchand et al. | ........ | 244/118.1 |
| 5,549,285 A * | 8/1996 | Collins | ........................ | 267/148 |
| 5,710,945 A * | 1/1998 | Thompson | .................... | 396/13 |
| 5,775,638 A * | 7/1998 | Duesler | ....................... | 244/54 |
| 6,199,793 B1 * | 3/2001 | Hainsworth et al. | ....... | 244/1 TD |
| 6,325,327 B1 * | 12/2001 | Zoppitelli et al. | ......... | 244/17.27 |
| 6,502,497 B1 | 1/2003 | Durand et al. | | |
| 6,530,563 B1 * | 3/2003 | Miller et al. | ................ | 267/136 |
| 7,320,389 B1 * | 1/2008 | Myers et al. | ................ | 188/380 |
| 2003/0075407 A1 * | 4/2003 | Taylor | ........................ | 188/380 |
| 2003/0132077 A1 * | 7/2003 | Davis | ......................... | 188/380 |

\* cited by examiner

*Primary Examiner*—Michael R Mansen
*Assistant Examiner*—Joshua J Michener
(74) *Attorney, Agent, or Firm*—Mark M. Friedman

(57) ABSTRACT

The pylon of the present invention provides damping of vibrations transferred in both directions between the aircraft and the payload. That is, the pylon of the present invention damps the effects of aircraft vibrations on the payload as well as the effects of payload vibrations on the aircraft. This is accomplished in the present invention by substantially eliminating any rigid connection between the aircraft and the payload under normal operational conditions. Support of the payload is provided by a plurality of resilient suspension elements that are attached to both a base element and a payload interface element. The attachment is such that the payload element is suspended below the base element. Thus configured, the resilient suspension elements dampen the transmission of vibrations between the payload interface element and the base element.

12 Claims, 5 Drawing Sheets

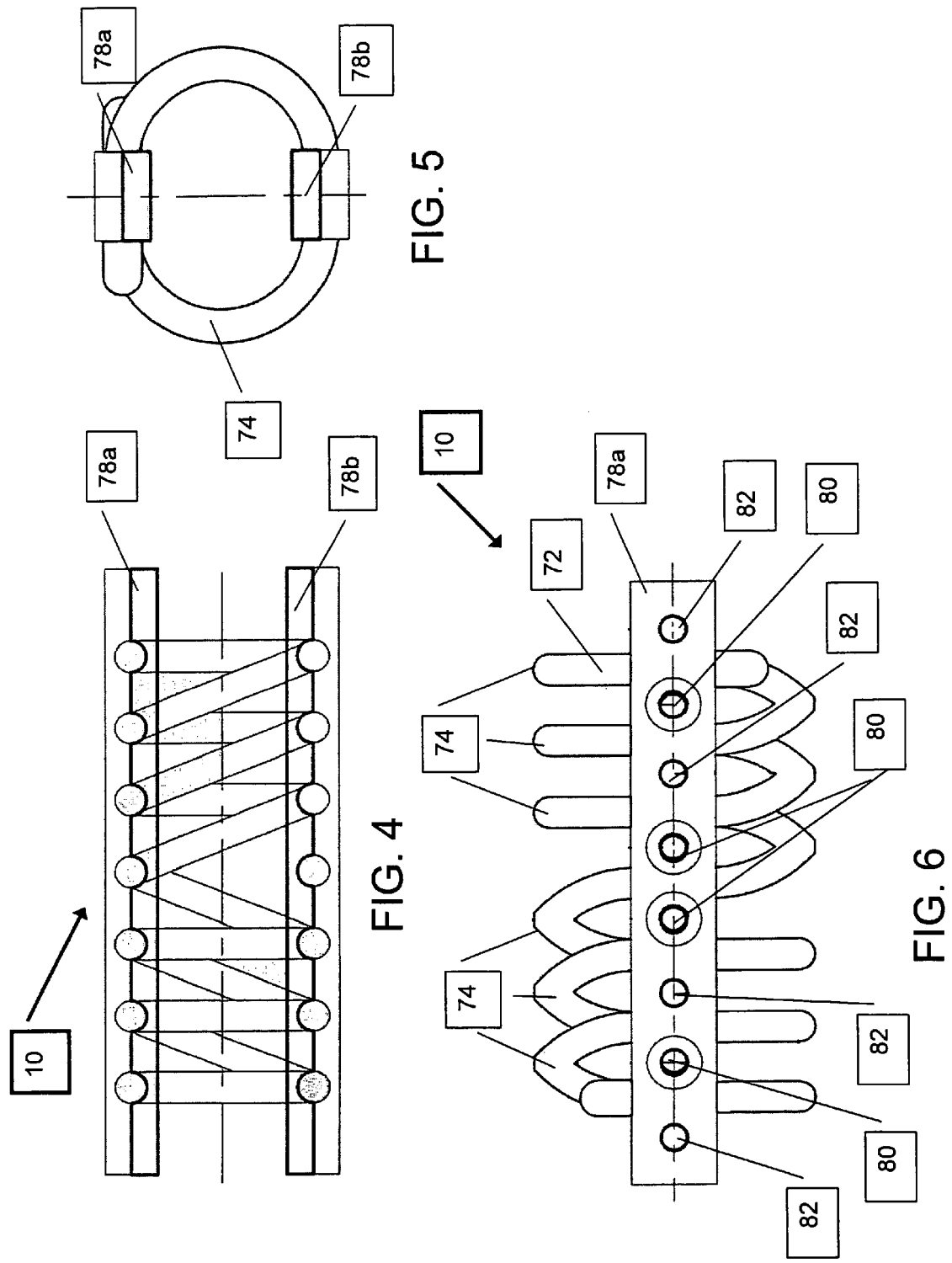

VIBRATION DAMPING PYLON

FIELD AND BACKGROUND OF THE INVENTION

The present invention relates to aircraft payload pylons and, in particular, it concerns a vibration damping pylon.

It is known to provide devices for damping translational and rotational vibrations between an aircraft and an external payload mounted on a pylon. U.S. Pat. No. 4,135,688 to England discloses a device specific damping mechanism which is part of the payload device itself.

U.S. Pat. No. 6,502,497 to Durand, et al. discloses a suspension device for connecting an item of on-board equipment to the structure of a vehicle. The device is configured so as to support the payload from below. That is, the payload is deployed on the top surface of the suspension device.

There is therefore a need for vibration damping pylon configured to support a payload that is suspended below the pylon.

SUMMARY OF THE INVENTION

The present invention is a vibration damping pylon

According to the teachings of the present invention there is provided, a vibration damping pylon affixed to the exterior of an aircraft, the pylon comprising: (a) a base element configured for attachment to the aircraft; (b) a payload interface element; and (c) a plurality of resilient suspension elements each attached to both the base element and to the payload interface element; wherein the of resilient suspension elements damp the transfer of vibrations between the payload interface element and the base element.

According to a further teaching of the present invention, the payload interface element is suspended below the base element.

According to a further teaching of the present invention, there is also provided, at least a first gross-motion limiter pin fixedly attached to one of the payload interface element and the base element, the at least a first gross-motion limiter pin configured to limit at least gross roll motion of the payload interface element.

According to a further teaching of the present invention, the base element includes an interchangeable aircraft specific pylon attachment adapter.

According to a further teaching of the present invention, each of the plurality of resilient suspension elements include a first attachment member for attachment to the base element and a second attachment member for attachment to the payload interface element.

According to a further teaching of the present invention, first attachment member and a second attachment member are deployed with an angle of inclination to a plane that vertically bisects the pylon that is in a range of between 30°-60°.

According to a further teaching of the present invention, first attachment member and a second attachment member are deployed with an angle of inclination to a plane that vertically bisects the pylon that is about 45°.

According to a further teaching of the present invention, the resilient suspension elements are configured as coiled-cable spring elements.

According to a further teaching of the present invention, the coiled-cable spring elements are deployed such that an axis of the coiled-cable spring elements is substantially parallel to a longitudinal axis of the pylon.

According to a further teaching of the present invention, at least a first and at least a second of the resilient suspension elements are configured so as to act in concert so as to limit at least roll and yaw movements of the payload interface element, and at least a third of the resilient suspension elements is configured to limit at least pitch movements of the payload interface element.

According to a further teaching of the present invention, the at least a first and at least a second the resilient suspension elements are configured as one pair of functionally associated resilient suspension elements.

According to a further teaching of the present invention, the at least a first and at least a second the resilient suspension elements are deployed having opposing but equal inclination.

According to a further teaching of the present invention, the at least a first and at least a second the resilient suspension elements are implemented as four resilient suspension elements configured as two pairs of functionally associated resilient suspension elements.

According to a further teaching of the present invention, the two pairs of functionally associated resilient suspension elements are implemented as pairs of resilient suspension elements with opposing but equal inclination.

According to a further teaching of the present invention, at least a first and at least a second of the resilient suspension elements are each deployed on opposite sides of a substantially vertical plane that extends longitudinally through the pylon.

According to a further teaching of the present invention, the base element includes at least one retaining flange and the payload interface element includes at least one abutment surface, and the at least one retaining flange and the at least one abutment surface are configured to support the payload interface element upon failure of the plurality of resilient suspension elements.

According to a further teaching of the present invention, there is also provided, a payload attached to the payload interface element, the payload including at least one imaging sensor.

BRIEF DESCRIPTION OF THE DRAWINGS

The invention is herein described, by way of example only, with reference to the accompanying drawings, wherein:

FIG. 4 is a front elevation of a coiled-cable spring suspension element constructed and operative according to the teachings of the present invention;

FIG. 5 is a side elevation of the coiled-cable spring suspension element of FIG. 3;

FIG. 6 is a top elevation of the coiled-cable spring suspension element of FIG. 3.

DESCRIPTION OF THE PREFERRED EMBODIMENTS

Figure 1:
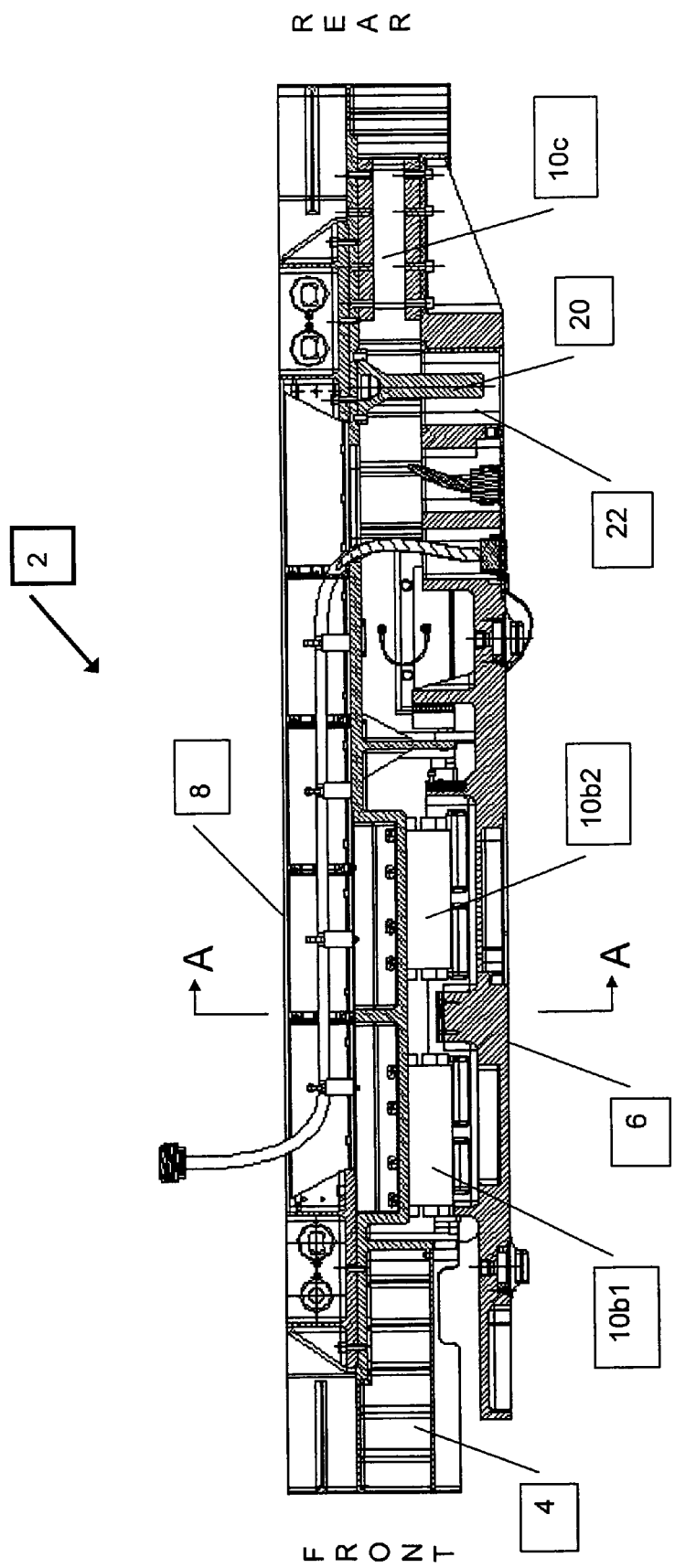
FIG. 1 is a cross-sectional view of a first preferred embodiment of a pylon constructed and operative according to the teachings of the present invention, the section being along a line that is parallel to the longitudinal axis of the pylon, this embodiment having two pairs of functionally associated resilient suspension elements located forwardly and an additional resilient suspension element located aft.

The present invention is a vibration damping pylon.

The principles and operation of vibration damping pylon according to the present invention may be better understood with reference to the drawings and the accompanying description.

By way of introduction, the pylon of the present invention provides damping of vibrations transferred in both directions between the aircraft and the payload. That is, the pylon of the present invention damps the effects of aircraft vibrations on the payload as well as the effects of payload vibrations of the aircraft. This is of particular importance when the payload includes optical sensors. Damping of vibrations is accomplished in the present invention by substantially eliminating any rigid connection between the aircraft and the payload, under normal operational conditions.

As used herein, the term "damping" refers to the reduction of vibrations in at least one predetermined frequency range. That is, either reducing the amplitude of vibrations or shifting the frequency of vibrations into a less problematic range, or a combination of the two. The present invention is particularly useful when associated with a payload that includes an imaging device, such as but not limited to, targeting sights, cameras (still or motion format), and optical sensors operational in substantially any frequency. Imaging devices are more affected by high frequency and high amplitude vibrations, since the affects of low frequency vibrations significantly slower than the integration times employed can be compensated by other known post-processing techniques. The present invention has been found to reduce natural vibration frequencies in the range of 40-70 Hz to a range of lower natural frequencies of 5-10 Hz. Vibration reductions of this magnitude are found to improve stability of the line-of-sight of an imaging payload by as much as seven times over the pylons currently being used.

Support of the payload is provided by a plurality of resilient suspension elements that are attached to both a base element and a payload interface element, to which the payload is attached. In the preferred embodiment discussed herein, the attachment is such that the payload element is suspended below the base element. Thus configured, the resilient suspension elements dampen the transmission of vibrations between the payload interface element and the base element. It should be noted, however, that embodiments in which the payload element is suspended above the base element are within the scope of the present invention. It will be appreciated that the resilient suspension elements may be configured as, but need not be limited to, the coiled-cable spring elements discussed below, helical springs, leaf springs and torsion bars.

For flexibility of application, the base element may include an interchangeable aircraft specific pylon attachment adapter, which allows a generic pylon configuration to be mounted on a full range of aircraft. It should be noted that it is within the scope of the present invention to adapt the support elements of the present invention so as to support a payload for land and water borne craft as well.

As used herein, the terms "right" and "left" refer to directions when viewing the pylon from the front.

Figure 3:
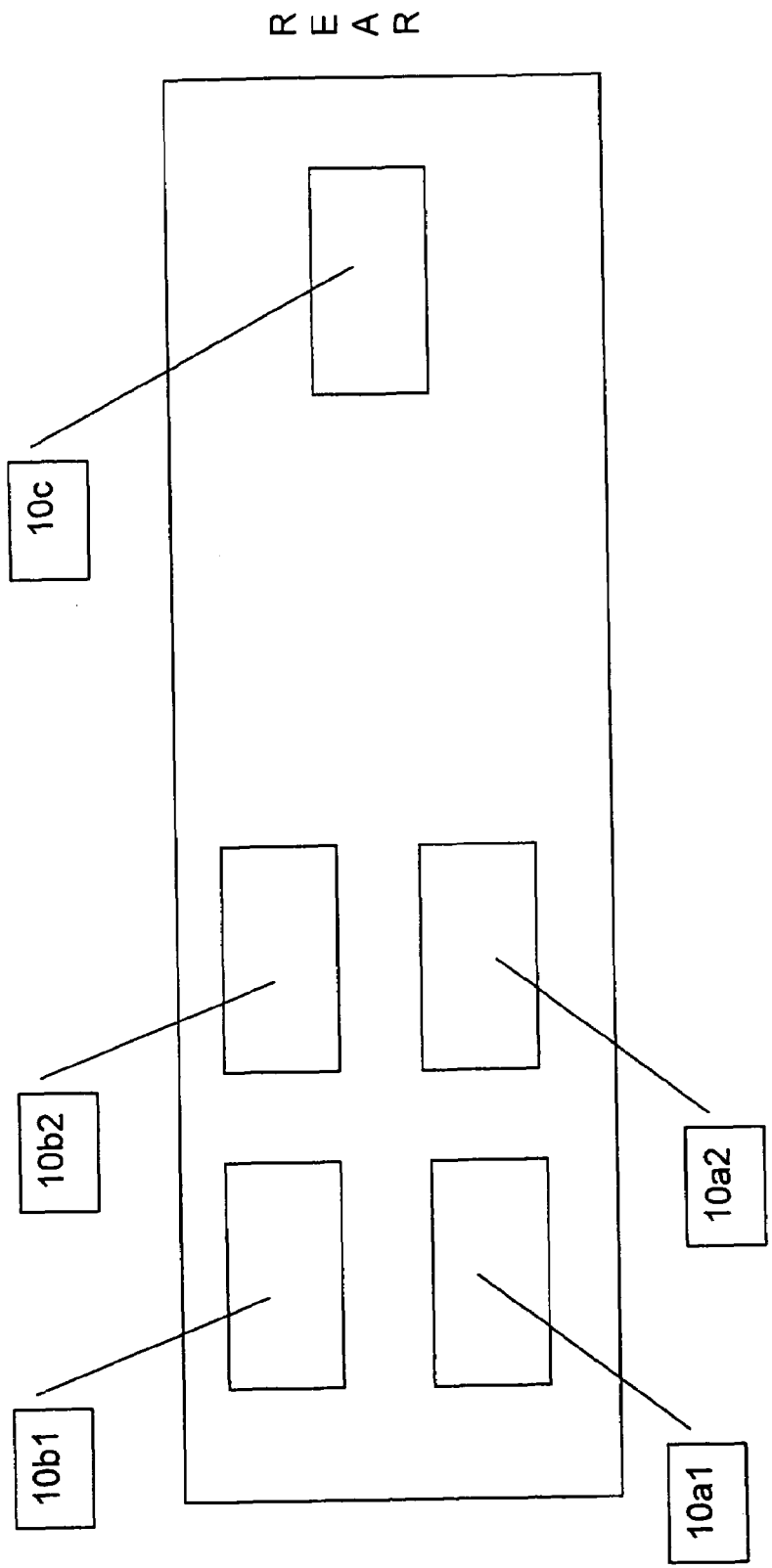
FIG. 3 is s schematic top view of the pylon of FIG. 1, showing the location of the coiled-cable spring elements.
Figure 7:
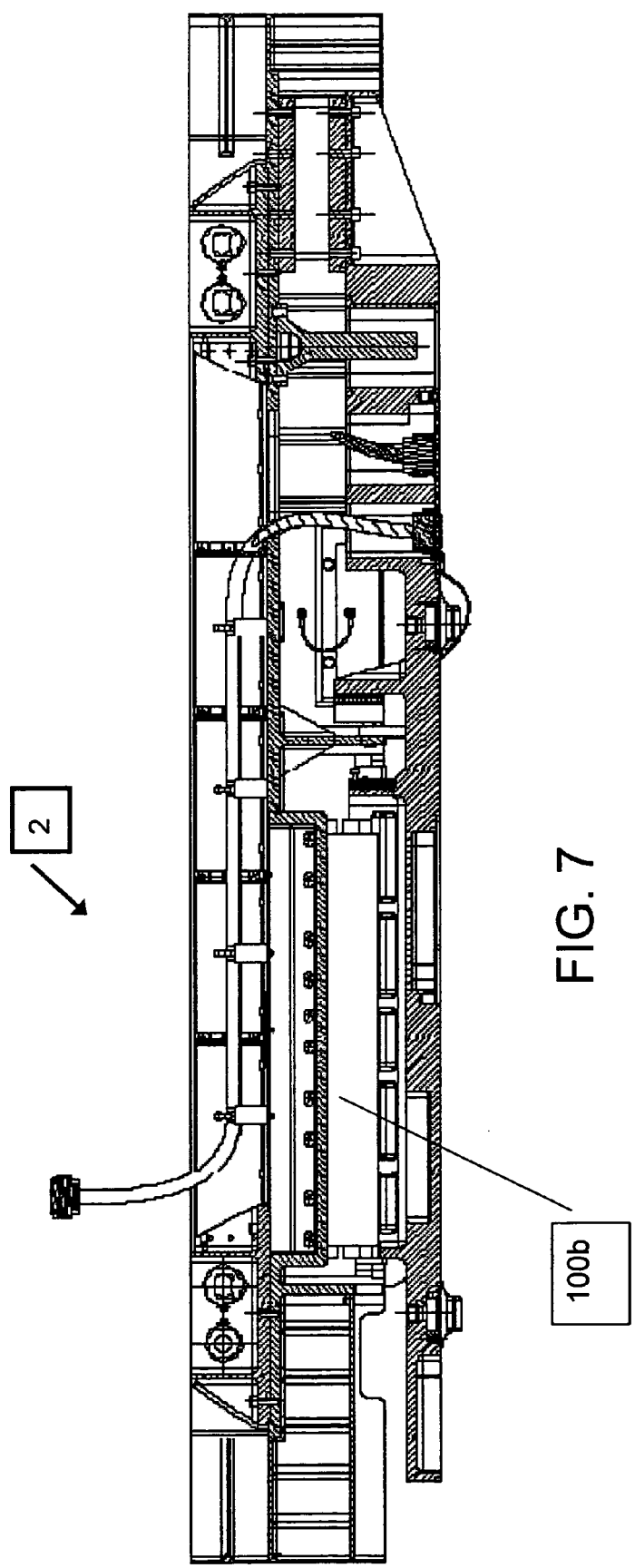
FIG. 7 is a cross-sectional view of a second preferred embodiment pylon constructed and operative according to the teachings of the present invention, the section being along a line that is parallel to the longitudinal axis of the pylon, this embodiment having one pair of functionally associated resilient suspension elements.

Referring now to the drawings, the preferred embodiments of the present invention, the resilient suspension elements are implemented as coiled-cable spring elements, as illustrated in FIGS. 3-5. Each of the coiled-cable spring elements, generally referred to herein as 10, is configured from a length of cable 72 that is coiled so as to form a number of coils 74 having substantially equal circumferences, as illustrated in FIG. 4. The coils 74 are secured by diametrically opposed attachment members 78a and 78b. Holes 80 in the attachment members 78a and 78b provide for attachment to the coiled-cable 72 using, for example screws, nuts and bolts, or pop-rivets. Holes 82 in the attachment members 78a and 78b provide for attachment to the either the base element or the payload interface element using substantially any appropriate fastener, such as but not limited to, screws, nuts and bolts, or pop-rivets. Therefore, attachment members 78a and 78b provide regions of attachment for attaching the coiled-cable spring elements to either the base element or the payload interface element. It will be readily understood that the resilient properties of the coiled-cable damps the transfer of vibrations between the base element and the payload interface element. Further, in the preferred embodiments of the present invention, coiled-cable spring elements are employed due to their load bearing and low frequency translation capability properties while compressed, under tension, or under torsion. It will be appreciated that the coiled-cable spring elements are capable of damping triaxial translation and rotational motion. It should be noted that the cable used is preferably steel cable, however, cables made of other materials, such as but not limited to, other metals (including alloys), polymers, carbon and carbon composite materials, are within the scope of the present invention.

Figure 2:
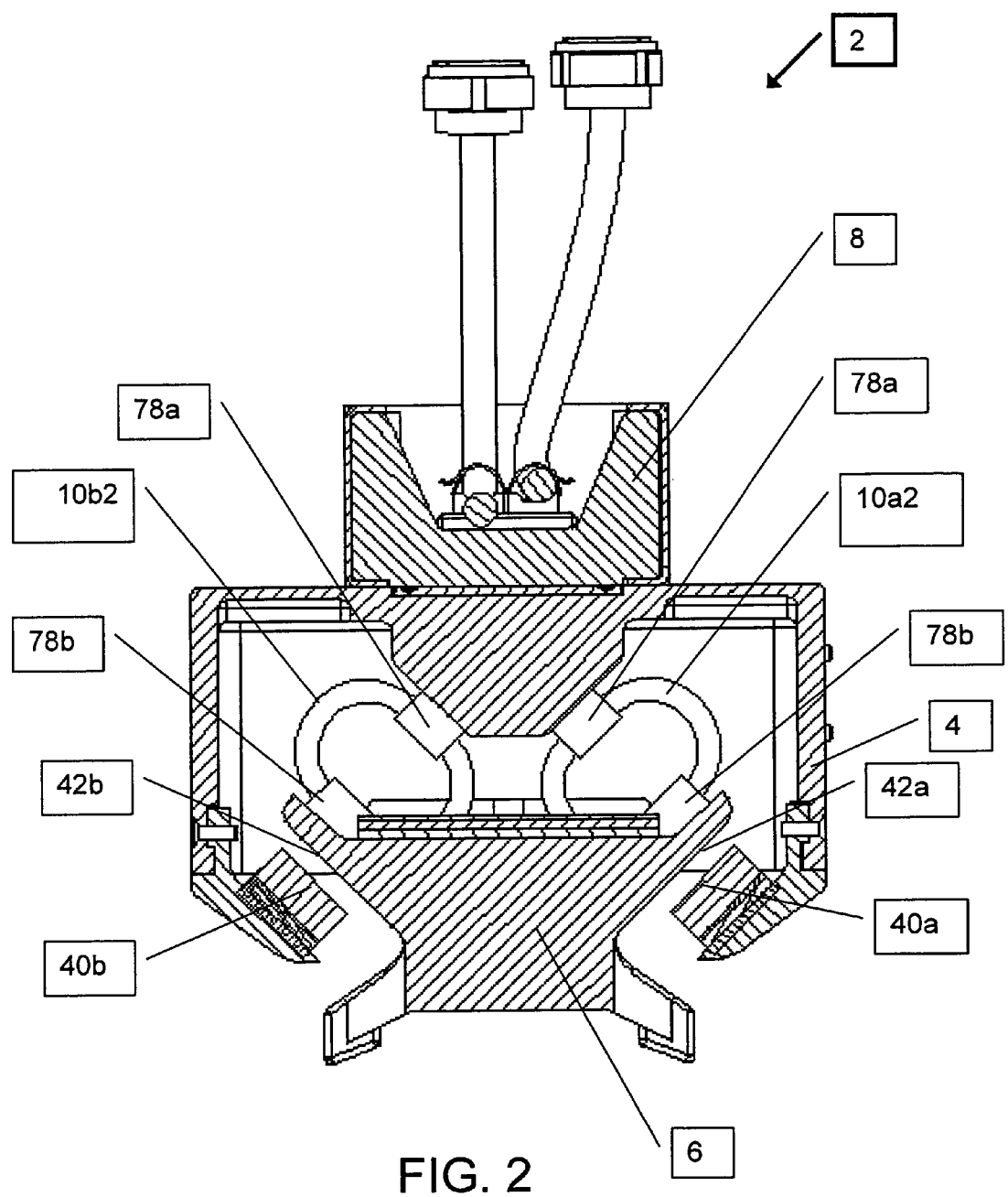
FIG. 2 is a cross-sectional view of the pylon of FIG. 1 taken along line A-A.

In the first preferred embodiment illustrated in FIGS. 1 and 2, the pylon 2 of the present invention includes a base element 4, and a payload interface element 6. The attachment is such that the payload interface element 6 is suspended below the base element 4. Thus configured, the coiled-cable spring elements 10 dampen the transmission of vibrations between the payload interface element 6 and the base element 4.

As illustrated here, five coiled-cable spring elements are employed, 10a1, 10b1, 10a2, 10b2, and 10c. Four of the coiled-cable spring elements are configured as two pairs of functionally associated coiled-cable spring elements, 10a1 and 10b1, and 10a2 and 10b2, with each of the coiled-cable spring elements in the pair deployed on opposite sides of a substantially vertical plane that extends longitudinally through the pylon. That is, a substantially vertical plane running linearly from the front of the pylon to the rear. The longitudinal axes of each of the coiled-cable spring elements, 10a1 and 10b1, and 10a2 and 10b2, are substantially parallel to the longitudinal axis of the pylon. The phrase "longitudinal axis" is used herein to refer to a line that is (typically) parallel to the boresight direction of the aircraft and, in a case where the pylon is symmetrical, a center line along the length of the pylon. As used herein, the phrase "functionally associated," refers to the association of two or more coiled-cable spring elements working cooperatively to achieve a desired outcome, such as limiting at least pitch, roll or yaw movements of the payload interface element, for example. That is to say, two "functionally associated" coiled-cable spring elements are configured so as to "act in concert" (see definition below) one with another.

In the preferred embodiments, the payload is attached to the payload interface element such that the center of gravity of the payload is deployed in relation to the four coiled-cable spring elements, 10a1, 10b1, 10a2 and 10b2 so that, when at rest, the weight of the payload is substantially equally distributed between the four coiled-cable spring elements, 10a1, 10b1, 10a2 and 10b2. In such a deployment, the fifth coiled-cable spring element 10c, which is deployed near the rear of the pylon in a substantially vertical alignment, is effective for limiting the pitch movements of the payload interface and thereby preventing "bottoming out" of the payload interface element 6.

It should be noted that although in the preferred embodiments of the present invention the resilient properties of the resilient suspension elements are substantially equal, this is not intended as a limitation. Therefore, it will be appreciated that the resilient properties of each of the resilient suspension elements employed need not be equal, and may be varied depending on a particular payload application. It will be appreciated that preferred embodiments of the pylon are substantially symmetrical, this too is not intended as a limitation, and asymmetrical embodiments are within the scope of the present invention.

As is seen clearly in FIG. 2, the angle of inclination of the attachment members 78a and 78b of the coiled-cable spring elements 10b2 and 10a2 one to another is about 90°. That is, each of the coiled-cable spring elements 10b2 and 10a2 is deployed such that the attachment members 78a and 78b are inclined at an angel of about 45° to the plane that vertically bisects the pylon, with the top attachment members 78a angled inwardly from the bottom attachment members 78b. That is to say, the coiled-cable spring elements in a pair are deployed with opposing but equal inclination about the axis of the coil. In such a dual pair deployment, these four coiled-cable spring elements, 10a1, 10b1, 10a2, and 10b2, act in concert so as to limit at least roll and yaw movements of the payload interface element while damping the transfer of vibrations between the base element 4, and a payload interface element 6. The phrase "act in concert" as used herein, refers to complimentary spring actions, such as but not limited to, expansion and compression, done in unison. Non-limiting examples include:

1. Clockwise yaw movements (when viewed from above the pylon) may be limited by compression of coiled-cable spring elements, 10a1 and 10b2, and expansion of coiled-cable spring elements, 10b1 and 10a2.
2. Clockwise roll movements (when viewed from the front of the pylon) may be limited by compression of coiled-cable spring elements, 10a1 and 10a2, and expansion of coiled-cable spring elements, 10b1 and 10b2.

Alternatively, the top attachment members 78a may be angled outwardly from the bottom attachment members 78b. It should be noted that the angle of inclination may be varied to substantially any angle between vertical and horizontal so as to adjust the amount of roll and yaw limitation provided by the pylon. However, a range of between 30°-60° is considered to be the most useful range, with about 45° as the most preferred angle of inclination. Further, each of the pairs of coiled-cable spring elements, 10a1 and 10b1, and 10a2 and 10b2, may be deployed with different angles of inclination.

A gross-motion limiter pin 20 is fixedly attached to the base element 4, and is associated with a gross-motion limiter slot 22 configured in the payload interface element 6. The dimensions of the gross-motion limiter pin 20 and slot 22 are such that at least gross roll and in some instances gross yaw motions of the payload interface element 6 cause contact of the gross-motion limiter pin 20 with the sides of the gross-motion limiter slot 22, thereby limiting the amount of gross roll and yaw motion. It should be noted that, alternatively, the gross-motion limiter pin 20 may be fixedly attached to the payload interface element 6, and the gross-motion limiter slot 22 may be configured in the base element 4. Further, a number of payload displacement restriction surfaces are provided throughout the pylon. These payload displacement restriction surfaces are configured to restrict movement of the payload interface element during extreme flight condition such as turbulence that may cause an abrupt change in aircraft altitude. Included in these payload displacement restriction surfaces are retaining flanges 40a and 40b configured in the base element 4 and abutment surfaces 42a and 42b configured in the payload interface element 6, which also act as a fail-safe support structure configured to support the payload interface element 6 if there should be a partial or full failure of the coiled-cable spring elements 10. It should be noted that embodiments of the present invention that employ a different mechanism to limit the amount of gross roll and yaw motion are within the scope of the present invention. Alternatively, embodiments of the present invention that employ no specific separate mechanism to limit the amount of gross roll and yaw motion are also within the scope of the present invention.

The base element 4 also includes an interchangeable aircraft specific pylon attachment adapter 8 that is configured to allow attachment of the pylon of the present invention to various aircraft having an appropriately configured pylon attachment adapter.

The second preferred embodiment of the present invention illustrated in FIG. 6 is substantially identical to the embodiment of FIG. 1. The primary difference is that coiled-cable spring elements, which are configured in FIG. 1 as two pairs of functionally associated coiled-cable spring elements, are implemented in the embodiment of FIG. 6 as one pair of functionally associated coiled-cable spring elements, 100b paired with another coiled-cable spring element (not shown) arranged linearly on opposite sides of a substantially vertical plane that extends longitudinally through the pylon and having axes that are substantially parallel to the longitudinal axis of the pylon. Therefore, at least roll and yaw movements may be limited by expansion and compression of different portions of the same coiled-cable spring element.

It will be appreciated that the above descriptions are intended only to serve as examples and that many other embodiments are possible within the spirit and the scope of the present invention.

What is claimed is:

1. A vibration damping pylon affixed to the exterior of an aircraft, the pylon configure to carry a payload, the pylon comprising:
    a) a base element configured for affachment to the aircraft;
    b) a payload interface element; and
    c) a plurality of resilient suspension elements each configured as helical coiled-cable spring elements, each resihent suspension element attached to both said base element and to said payload interface element, said plurality of resilient suspension elements including at least:
        (i) a first group of at least a first and at least a second helical coiled-cable spring elements deployed such that, when at rest, a weight of the payload is substantially equally distributed between said at least first and said at least second helical coiled-cable spring elements; and
        (ii) a second group of at least a third helical coiled-cable spring element deployed so as to be longitudinally spaced apart from said first group, such deployment effective for limiting pitch movements of said payload interface element;
wherein said resilient suspension elements are a sole support structure by which said payload interface is attached to said base element and said helical coiled-cable spring elements are deployed such that longitudinal axes of all said coiled-cable spring elements are substantially parallel one to another and a longitudinal axis of the pylon.

2. The pylon of claim 1, further including at least a first gross-motion limiter arrangement having components configured on said base element and said payload interface element, said gross-motion limiter arrangement configured such that at least gross roll of the payload interface element causes contact of said components configured in said payload interface element with said components configured on said base element thereby limiting at least gross roll motion of said payload interface element.

3. The pylon of claim 1, wherein said base element includes an interchangeable aircraft specific pylon attachment adapter.

4. The pylon of claim 1, wherein at least a first and at least a second of said resilient suspension elements are each deployed on opposite sides of a substantially vertical plane that extends longitudinally through the pylon and are configured so as to act in concert so as to limit at least roll and yaw movements of the payload interface element.

5. The pylon of claim 4, wherein said at least a first and at least a second said resilient suspension elements are deployed having opposing but equal inclination.

6. The pylon of claim 5, wherein each of said plurality of resilient suspension elements include a first attachment member for attachment to said base element and a second attachment member for attachment to said payload interface element.

7. The pylon of claim 6, wherein first attachment member and a second attachment member are deployed with an angle of inclination to a plane that vertically bisects the pylon that is in a range of between 30°-60°.

8. The pylon of claim 7, wherein first attachment member and a second attachment member are deployed with an angle of inclination to a plane that vertically bisects the pylon that is about 45°.

9. The pylon of claim 7, wherein said at least a first and at least a second said resilient suspension elements arc configured as one pair of functionally associated resilient suspension elements.

10. The pylon of claim 7, wherein said at least a first and at least a second said resilient suspension elements are implemented as four resilient suspension elements configured as two pairs of functionally associated resilient suspension elements.

11. The pylon of claim 10, wherein said two pairs of functionally associated resilient suspension elements are implemented as pairs of resilient suspension elements with opposing but equal inclination.

12. The pylon of claim 1, wherein said base element includes at least one retaining flange and said payload interface element includes at least one abutment surface, and said at least one retaining flange and said at least one abutment surface are configured to support said payload interface element upon failure of said plurality of resilient suspension elements.

\* \* \* \* \*